(No Model.) 2 Sheets—Sheet 1.
G. C. BILLUPS.
REVOLVING HARROW.
No. 440,836. Patented Nov. 18, 1890.
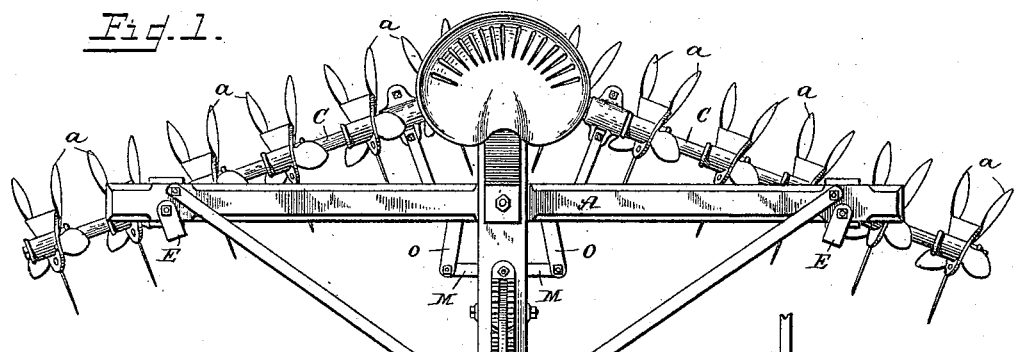
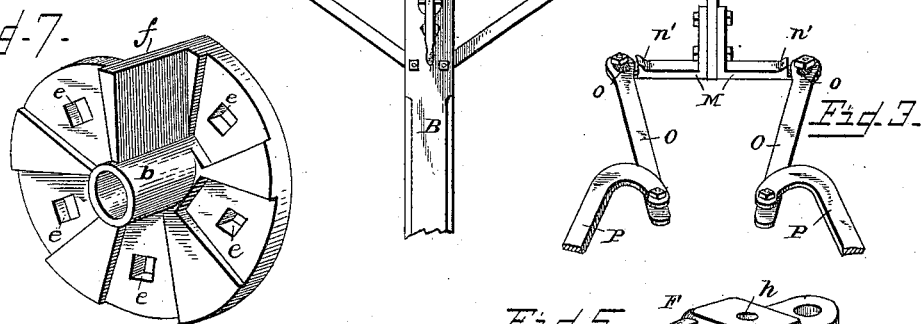
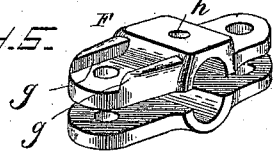
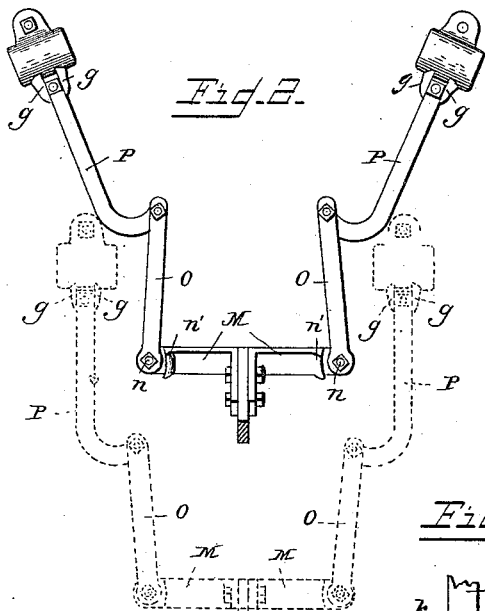
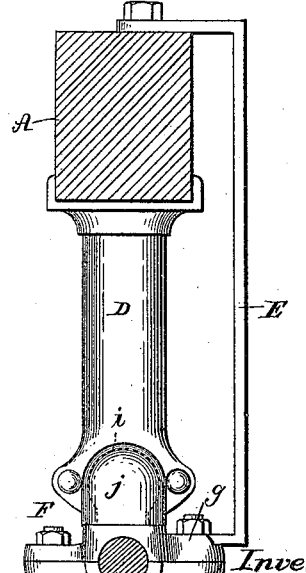
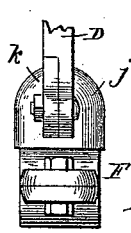
Witnesses
Edwin L. Bradford
E. Everett Ellis
Inventor
George C. Billups
By Wm C. W. Entire
Attorney
THE NORRIS PETERS CO., PHOTO-LITHO., WASHINGTON, D. C.

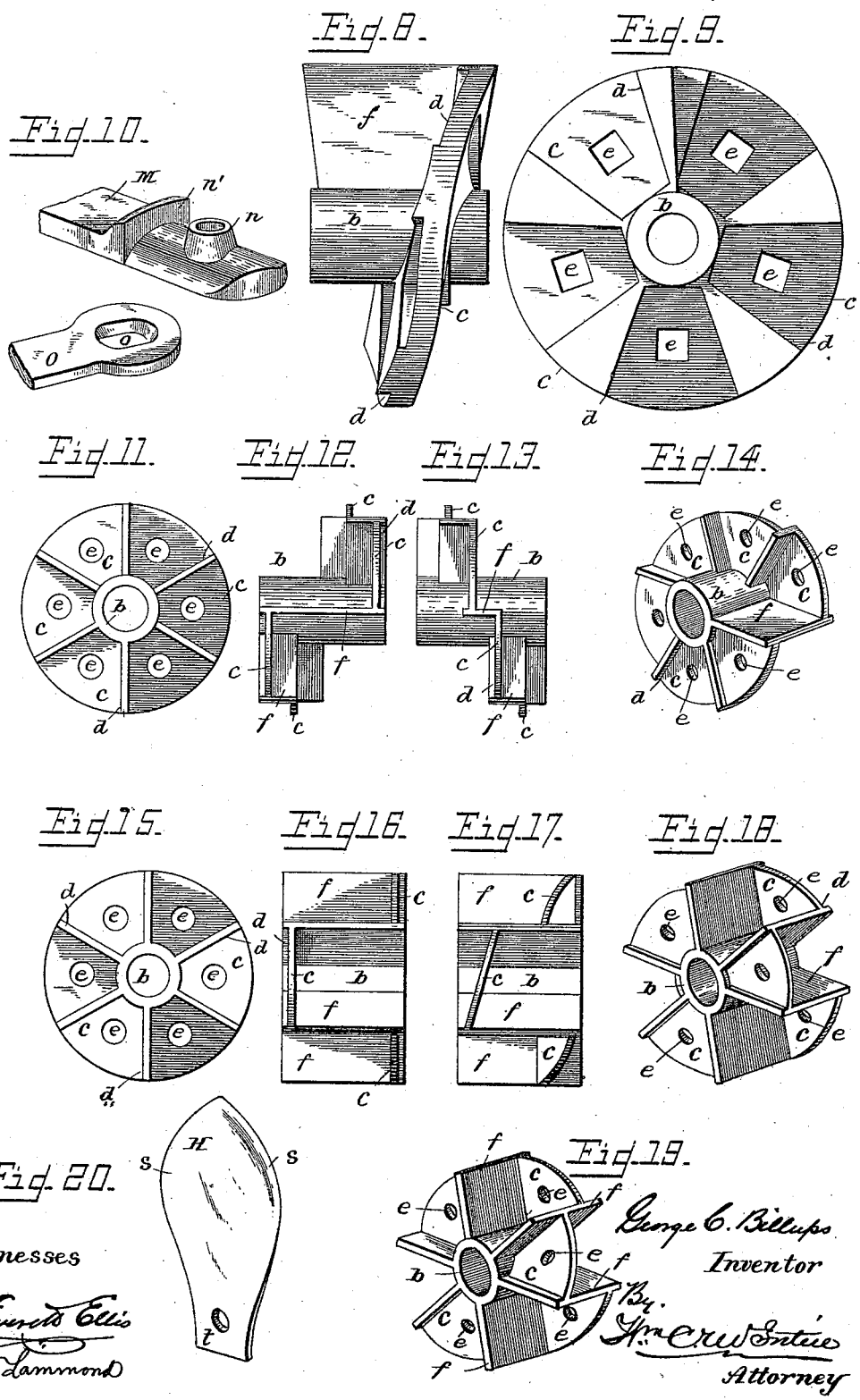

UNITED STATES PATENT OFFICE.

GEORGE CHRISTOPHER BILLUPS, OF NORFOLK, VIRGINIA.

REVOLVING HARROW.

SPECIFICATION forming part of Letters Patent No. 440,836, dated November 18, 1890.

Application filed May 3, 1890. Serial No. 350,419. (No model.)

*To all whom it may concern:*

Be it known that I, GEORGE CHRISTOPHER BILLUPS, a citizen of the United States, residing at Norfolk, in the county of Norfolk and State of Virginia, have invented certain new and useful Improvements in Revolving Harrows; and I do hereby declare the following to be a full, clear, and exact description of the invention, such as will enable others skilled in the art to which it appertains to make and use the same, This invention relates to certain new and useful improvements in revolving harrows; and it consists substantially in such features of arrangement, construction, and combinations of parts as will hereinafter be more particularly described, and pointed out in the claims.

The object of the invention is to provide an improved revolving harrow in which the gang-shafts are provided with separate sets of knives or blades arranged at intervals thereon, and in which the throw or turning of the knives or blades of each set shall be in different vertical planes, so as to penetrate the soil in varying lines.

A further object of the invention is to not only have the knives or blades of each set operate in different vertical planes, but also have them penetrate the soil in a direction oblique to their axis of rotation.

A further object of the invention is to provide the throw or the turning of the knives of each set in a spiral direction and either straight or oblique to their axis of rotation.

A further object of the invention is to provide a means of support for the upper cross-beam of the harrow-frame, in which the gangs are free to be shifted or turned through the medium of shifting-lever and mechanism without altering or varying the relative positions of the bearings for the gang-shafts.

A further object of the invention is to provide braces between said cross-beam and the bearings or boxes on the gang-shafts, by which strong connections are had and a free accommodation to the shifting of the gang-shafts and their bearings effected.

Further, the invention has for its object to provide mechanism for shifting or turning the gangs without having the knives or blades strike or come in contact with any portion of such mechanism, and also maintain the same relative connections with the shafts.

Further, the invention has for its object to provide the knife or blade of a revolving harrow of a construction by which ready attachment may be effected, and also of such shape or form as to enable the same to be readily reversed and used equally as well on one edge as the other.

Finally, the invention has other minor objects in view, all of which will more fully hereinafter be understood when taken in connection with the accompanying sheets of drawings, wherein—

Figure 1 represents a top or plan view of a revolving harrow embodying the several features of my improvement; and Fig. 2 is a plan view of the shifting mechanism for the gang-shafts, the dotted lines representing the position of parts when the gangs have been shifted to bring their shafts parallel with the upper beam. Fig. 3 is a perspective view of said shifting mechanism with parts broken off, so as to more clearly indicate the general construction and arrangement. Fig. 4 is an enlarged side view of one of the supports and braces between the upper beam and the gang-shafts and their bearings or boxes. Fig. 5 is a view in perspective of one of the boxes or bearings for the gang-shafts, so as to indicate the form of construction of the upper part which receives the lower end of the brace. Fig. 6 is a view in detail, taken at right angles to the lower portion of Fig. 4. Fig. 7 is a view in pespective of one form of hub I employ to which the knives or blades are secured or attached. Fig. 8 is a view of the hub represented by Fig. 7 as it appears on looking at the edges of its flanges. Fig. 9 is a view of the hub shown by Figs. 7 and 8, looking at the same from the left-hand side of Fig. 8. Fig. 10 is a view in perspective of detached parts of the gang-shifting devices, showing form of movable connection. Figs. 11, 12, 13, and 14 are side longitudinal elevations and perspective views, respectively, of my preferred form of knife-carrying hub, the said Figs. 12 and 13 representing the manner in which the wings or flanges begin at or near one end of the hub and extend in successive steps around the periphery thereof and terminate at or near the opposite end of the hub and are united or connected by a web. Fig. 15 is a similar view to Fig. 12 of a modification in the form of hub, and Fig. 16 is a longitudinal elevation of such modification. The wings or flanges in this instance, instead of passing around the periphery of the hub in successive steps, are made to alternate with each other at or near to the opposite ends of the hub. Fig. 17 is a similar view to the preceding figure with the flanges alternating with each other and extending obliquely across. Fig. 18 is a view in perspective of the hub illustrated by Fig. 16. Fig. 19 is a view in perspective of a modified form of hub in which the flanges or wings alternate with each other; but instead of being straight they are inclined to one side, so as to give the knives or blades an oblique direction to operate the same, as in the form of hub shown in Fig. 8. Fig. 20 represents a view in perspective of my improved oval-shaped double-edged cutting knife or blade.

Before proceeding with a more detailed description of the several parts constituting my invention I desire to state that with reference to the hubs to which the cutting knives or blades are attached or secured my purpose is to cover, broadly, a hub having projecting from its outer surface a series of flanges or wings arranged in different or varying planes and adapted to receive and hold the cutting knives or blades either at straight right angles or in oblique directions, by which in either case the knives when revolved will cut the entire surface of ground over which they pass.

To explain several ways in which the hub may be made, I have illustrated several forms or modifications; but the most preferred by me in practice is the one in which the wings or flanges of the hub proper extend straight out from its outer surface in a successive or step-like manner, or, in other words, beginning at or near one end of the hub and stepping along and around its surface or periphery to a point at or near its other end and opposite, or nearly so, to the point of beginning, the points of beginning and ending being preferably connected by a strengthening rib or flange. The blades when secured to this hub strike the ground in varying planes, but at straight right angles so long as the gangs are parallel with the upper beam. To secure the oblique cut with this hub the gangs are thrown in or out, as desired.

In addition to the hub having the flanges extending from its surface in a successive or step-like manner, I have also shown a hub in which the flanges or wings are spirally arranged, so as to cause the knives when attached to strike the ground in an oblique direction to their axis of rotation even when the gangs are parallel with the upper beam as well as in different planes. Furthermore, I have shown in another instance how the webs to which the knives are attached may be arranged to alternate with each other at the opposite ends of the hub, said webs being connected by strengthening ribs or flanges in like manner as the beginning and ending of the step-like or successive arrangement of webs are connected in the next preceding arrangement explained. Still further, I may in some instances employ the alternating arrangement of ribs and construct them obliquely across the surface or periphery of the hub.

For the purpose of enabling the shifting of the gang-shafts I employ a pair of levers having one of their ends crooked or curved, and being movably connected at such ends with two straight levers, which are in turn movably connected to two angle-arms, between which the lower ends of the operating-levers are held and secured. The two pairs of levers constitute what might be termed a "toggle," and the straight ends of the crooked levers are received and held by specially-constructed bearings or boxes that are fitted upon the gang-shafts. These bearings or boxes referred to consist of two parts, each of which is adapted to fit the shaft and be tightly secured thereto by bolts and nuts which unite them, and the upper parts of these bearings or boxes are formed with two side flanges, which between them create a seat into which the ends of the levers are received. The effect of the construction and arrangement is that when the hand-lever is moved back or forth the gangs will be caused to move in conformity thereto, and the same relative positions of the points of connection will always be maintained.

The turning point or bearing on which each gang-shaft moves is constituted of a box or bearing that is clamped to the shaft, an upright support having a universal movement with respect to the box, and a brace-rod secured to the box and movably connecting at its upper end with the beam, said beam resting in said support, all of which will hereinafter be more fully understood on reference to the drawings by the several letters marked thereon, and of which A represents the upper front beam of a revolving harrow, and B the tongue thereof, the seat for the driver and general arrangement thereof being of ordinary form.

C C represent the gang-shafts, which have arranged thereon at suitable distances apart separate sets of cutting knives or blades $a\,a$, as shown, and upon reference to Fig. 1 of the drawings it will be observed that the knives of each set are arranged in different positions, so as to turn in varying vertical planes, and thereby operate upon the whole surface of ground over which they pass.

To effect the desired arrangement of the knives, so as to permit them to be readily attached and detached, I have provided a special form of hub therefor, and which hub, while represented in several forms, will be found essentially to consist of a circular or sleeve portion $b$, having projecting from its surface or periphery a series of flanges or wings $c$, arranged in different or varying planes, each wing being preferably notched at *d* to receive the shank of the cutting-knife and provided with a squared hole *e* or opening to receive the securing pin or bolt. While it is preferable to bolt these knives or blades to the hubs, it is obvious that they can be riveted, cast, or otherwise secured to same. These wings may be adapted to receive any form of cutting-knife whatever, although I have provided herein a special form of knife, a more full description of which will be given hereinafter.

In Figs. 11, 12, 13, and 14 I have represented the preferred form of hub which I use in practice, and on reference to Figs. 12, 13, and 14 it will be seen that the flanges extend straight out from the periphery of the hub proper and move in successive steps along and around same, the points of beginning and ending being preferably united by a longitudinal strengthening-rib *f*. This arrangement is, as stated, the preferred one; but in lieu thereof I may construct the wings passing spirally around, as shown in Figs. 7, 8, and 9. Similar ribs *f* may also be employed to connect the wings in the several forms of hub shown, as is indicated.

In Figs. 16 and 18 the wings are shown to alternate from end to end of the hub, and in Figs. 17 and 19 the same arrangement is employed, with the exception that said wings are given an oblique turn, so as to cause the knives when attached and revolved to penetrate the soil both obliquely and in varying planes or lines.

The axial or turning point for the gang-shafts is obtained as follows: At the proper point on each shaft I clamp thereon a box F, such as represented in Fig. 5, and which is shown to be in two parts, the upper one of which being formed or provided at one side with flanges *g g* and an opening *h*. The two parts are secured to the shaft by bolts and nuts, as shown in Fig. 4, and screwed or otherwise fitted in the opening *h* is a ball or sphere *i*. The said ball *i* is inclosed or received into the hollow or concave socket *j* of an upright support D, a cap or cover *k* being fitted on and secured, as shown in Figs. 4 and 6. For the purpose of preventing the inner ends of the gang-shafts from lifting from their proper positions on the ground, I have specially shaped or constructed both the boxes F and the caps *k*, and on reference to Figs. 4, 5, and 6 it will be seen that the upper surface of the box is flattened, so as to have a flat bearing around the ball, and the lower edge of cap *k* of the upright support D rests upon this flattened surface, thus allowing no room for the inner ends of the gang-shafts to lift, as the pressure of the cap on the box prevents it, but in no way interferes with the shifting in or out of said shafts. From this construction and arrangement it will be seen that when the gang-shafts are shifted said shafts will move around the axis thus afforded them by the ball-and-socket joint. It will further be seen that the uprights D D support the beam A by being adapted at their upper ends to receive it.

In order to maintain the boxes F in proper position, it becomes necessary to provide the braces E, which braces are bent to a right angle at both their upper and lower ends, the upper ends overlapping the top of the beam A and having a set-screw passed therethrough, so as to furnish axes for the braces to turn on whenever the gang-shafts are shifted, it being evident that since the lower ends of the braces are rigidly secured to the boxes on the shafts no turning of the shafts could be effected unless movement or turning of the braces were permitted at their upper ends; hence the construction explained. The lower ends of the two braces are received between the flanges *g g* on the boxes F and rigidly secured by one of the same bolts which serve to unite the two parts of which said box is made.

The shifting mechanism which I employ for the gang-shafts is as follows: M M are two angle-arms secured correspondingly to the opposite sides of the operating hand-lever and having one of their branches extending outwardly horizontally, said horizontal portions being provided at or near their extremities with studs or pintles *n n*, which are received by the oblong openings *o o*, formed in the ends of the straight levers O O, said openings being made oblong for the purpose of accommodating to a slight rise-and-fall action of the levers O O in the operation of the parts. The horizontal branches of the arms M M are also formed or provided with check-pieces *n n*, (see detail, Fig. 10,) so that the levers O O are prevented from turning too far inwardly. The opposite ends of the levers O O are in turn provided with studs and pivotally united to the bent or curved ends of two levers P P, which are rigidly connected at their other ends to boxes (formed like the boxes F, hereinbefore described with respect to flanges *g g*) that are clamped to the shafts at the proper points. By referring to Fig. 2 the movement of the several parts will be fully understood, and with this arrangement of levers I am enabled to throw the gangs in a concave or convex position with respect to the upper beam, by which both the in and out throw of knives is obtained.

The form of cutting knife or blade H which I resort to, while intended for use on my special form of hub, is yet of itself capable of attachment to any other form. The said knife or blade is preferably oblong in form, and is provided with double cutting-edges *s s*, so as to allow the same to be taken off after one edge has become worn and turned around to bring its other edge into operation. This knife is preferably formed or provided with a shank *t* to fit the notches *d* in the wings of the hub, and it is also provided with a hole for passage of a securing-bolt.

From the foregoing description it is thought the purpose and nature of my invention will be fully understood, and while I have herein referred to the several parts in a specific manner I do not desire to be understood as limiting myself to the precise arrangement and construction of parts shown, since it is evident that immaterial changes therefrom could be resorted to and still come within the scope of my invention.

It will of course be understood that in uniting or joining the several parts of the shifting mechanism suitable bolts and nuts are used, so as to prevent disjoinder of the parts.

Having thus described my invention, what I claim as new, and desire to secure by Letters Patent, is—

1. In a revolving harrow, a series of independent knife or blade supporting hubs, each hub having a series of wings or flanges projecting from its outer surface or periphery and said wings being connected longitudinally of the hub by strengthening-webs, substantially as described.

2. In a revolving harrow, a series of independent knife or blade supporting hubs, each hub having a series of wings or flanges projecting from its outer surface or periphery in different or varying vertical planes and said wings being connected longitudinally of the hub by strengthening-webs, substantially as described.

3. In a revolving harrow, a series of independent knife or blade supporting hubs, each hub having a series of wings or flanges projecting from its outer surface or periphery in different or varying vertical planes and extending obliquely to the axis of the hub, substantially as described.

4. In a revolving harrow, a series of independent knife or blade-supporting hubs, each hub having a series of wings or flanges projecting straight out from its surface or periphery in different or varying planes and extending around the same in a successive or step-like manner and said wings being united by strengthening-webs, substantially as described.

5. In a revolving harrow, a series of independent knife or blade supporting hubs, each hub having wings or flanges projecting from its outer surface or periphery and extending around the same in a spiral direction, said wings being united at the point of beginning and ending by strengthening-webs, substantially as described.

6. In a revolving harrow, the combination, with the gang-shaft and upper beam, of a support for said beam, a movable connection between the support and gang-shaft, and a brace rigidly secured to said movable connection, but movably connected to the beam, substantially as described.

7. In a revolving harrow, the combination, with the gang-shaft and upper beam, of the box clamped to said shaft and having the side flanges and top bearing, the ball formed with or secured to said box, the support formed at its lower end with a socket to receive the ball, the cap secured to same and made to rest on the said top bearing of box, and the brace secured rigidly to the box between the flanges and movably connected to the beam, all substantially as described.

8. In a revolving harrow, the combination, with the operating-lever and gang-shafts, of angle-arms or brackets secured on opposite sides of said lever and toggle-levers movably connected to said arms, but rigidly connected to said gang-shafts, substantially as described.

9. In a revolving harrow, the combination, with the shifting hand-lever and gang-shafts, of boxes or bearings clamped to the shafts, curved levers rigidly connected at their straight ends to said boxes and at their curved ends movably connected with straight levers, and arms or brackets secured to the lower end of the hand-lever and to which said straight levers are movably connected in turn, substantially as described.

10. In a revolving harrow, the gang-shifting mechanism herein described, the same consisting of the duplicate curved levers, the duplicate straight levers, and the duplicate arms or brackets, the whole being formed or provided with the check-pieces and bearing-lug, and the straight levers with elongated holes to fit over said lugs, substantially as described.

In testimony whereof I affix my signature in presence of two witnesses.

GEORGE CHRISTOPHER BILLUPS.

Witnesses:
GEO. I. GOSLING,
W. THOMPSON BARROW.